United States Patent
Brewington et al.

[11] Patent Number: 6,116,797
[45] Date of Patent: Sep. 12, 2000

[54] TWO WAY WRAP SPRING CLUTCH GEAR

[75] Inventors: James Gabriel Brewington; Richard Hunter Harris, both of Raleigh, N.C.

[73] Assignee: International Business Machines Corporation, Armonk, N.Y.

[21] Appl. No.: 09/244,556

[22] Filed: Feb. 3, 1999

[51] Int. Cl.$^7$ ................................................. B41J 11/26
[52] U.S. Cl. .................... 400/621; 192/33 C; 192/415; 192/81 C; 192/104 C
[58] Field of Search .................. 400/621, 314, 400/314.6; 192/33 R, 33 C, 12 R, 41 S, 80, 72, 81 C, 104 R, 104 C, 93 R, 84.81, 70.25, 84.6, 48.2

[56] References Cited

U.S. PATENT DOCUMENTS

| | | |
|---|---|---|
| 2,868,001 | 1/1959 | Russell . |
| 3,405,791 | 10/1968 | Kaplan . |
| 3,494,451 | 2/1970 | Mallory et al. . |
| 3,712,432 | 1/1973 | Babler ........................................ 192/26 |
| 3,750,785 | 8/1973 | Smith et al. ........................... 192/81 C |
| 3,877,274 | 4/1975 | Wahlstedt ............................ 192/104 C |
| 4,207,281 | 6/1980 | MacDonald ........................... 192/48.2 |
| 4,388,007 | 6/1983 | Meier et al. .......................... 400/314.6 |
| 4,673,073 | 6/1987 | Weatherby ............................. 192/81 C |
| 4,763,764 | 8/1988 | Smith ..................................... 192/41 S |
| 5,413,426 | 5/1995 | Ijuin et al. ............................... 400/621 |
| 5,482,389 | 1/1996 | Bickof et al. ........................... 400/621 |
| 5,653,509 | 8/1997 | Bierl, Jr. ................................ 192/12 R |
| 5,718,313 | 2/1998 | Sekine ................................... 192/33 C |
| 5,960,926 | 10/1999 | Schubert .............................. 192/70.25 |

*Primary Examiner*—Eugene Eickholt
*Attorney, Agent, or Firm*—John D. Flynn; Winstead, Sechrest & Minick

[57] ABSTRACT

A gear mechanism containing a clutch assembly made of an outer member with an offset hub, a wrap spring, a pin wherein the rotation of the pin around the offset hub is less than one revolution. A protrusion on a stop at a fixed location is used to dislodge the wrap spring such that it is incapable of transferring torque to the pin. With the spring dislodged, the pin ceases rotation as the hub continues to rotate. Once the power source reverses the rotation, the spring engages the pin which causes the spring to tighten around the hub. The tightening of the spring causes the spring to transmit torque and consequently move the pin away from the stop. In applications where, in one direction, a rotation of less than one revolution is acceptable, the use of a fixed protrusion to dislodge the spring allows the full torque of the driving member to drive the mechanism in either rotational direction.

23 Claims, 5 Drawing Sheets

TWO WAY WRAP SPRING CLUTCH GEAR

TECHNICAL FIELD

The invention relates in general to geared drive systems, and in particular to geared drive systems that rely on clutch mechanisms to disengage the rotation of gear systems.

BACKGROUND INFORMATION

Wrap spring clutches have been used for several decades and are commonly used to vary the torque in uni-directional devices. Two-way wrap spring clutches or bi-directional couplings have also been used where the overrunning torque in one direction is different than the overrunning torque in the reverse direction. Such devices are well known and a typical configuration is shown and described in U.S. Pat. No. 2,868,001 issued Jan. 13, 1959 to Russell. However, most prior solutions are for use in mechanisms requiring multiple revolutions of the clutch or drive mechanisms. Thus, they tend to be overly complex and expensive for use with mechanisms where the rotation is restricted to less than one revolution such as a gear system for a cutter blade in a continuous-roll printer.

In a continuous-roll printer or facsimile machine, a stepper motor may performs two functions. When the motor turns in a forward direction, a geared system unwinds paper from the paper roll and advances it so that printing can occur. When the motor turns in the reverse direction, another gear drive system engages a cutter blade to cut the printed paper from the roll. Using the same motor both for feeding paper through the printer and cutting the printed paper is economical. In the printer example described above, a simpler clutch is typically used, such as a wrap spring slip clutch with an overrunning torque, hereinafter referred to as a slip clutch. A slip clutch typically connects the gear drive system and the cutter blade. Slip clutches are used to transmit power in one direction of rotation only (called the "locking rotation") and include teeth, ratchet or spring mechanisms that lock a driven part to a driving part when the driven part is turned in the locking direction. When the rotation of the driving part is reversed, the mechanism releases, causing the driven part to stop turning while the driving part continues to turn or "overrun" the driven part.

Some slip clutches are designed with an "overrunning torque" or a mechanism that will not automatically release during reverse rotation. A slip clutch with an overrunning torque will transmit torque from the driven part to the driving part even in the reverse direction, but will slip if the torque required to drive the driven part exceeds the overrunning torque. The previously mentioned Patent, issued to Russell, discloses an invention creating overrunning torque in both rotational directions.

As an example, consider a slip clutch with an overrunning torque of 1 inch-ounce. This slip clutch will lock if driven in its locking rotation, transmitting rotation of the driving part to the driven part without slippage. In the reverse rotation, the clutch will slip if the load on the driven part exceeds 1 inch-ounce.

Causing the clutch to slip, however, requires an amount of torque equal to the overrunning torque as a friction loss. In other words, a drive motor generating 10 inch-ounces of torque in the reverse direction through a clutch that is slipping wastes 1 inch-ounce of torque required to cause the clutch to slip. The effective torque of the motor is thereby reduced to 9 inch-ounces.

The slip clutch is configured so that a reverse rotation of the stepper motor causes a locking, or forward rotation of the slip clutch. When the stepper motor and gear drive are driven in reverse, the slip clutch locks, engaging the cutter blade to slice off a piece of paper. Afterwards, the stepper motor resumes its forward rotation, causing the slip clutch to turn in reverse. The clutch, however, will not release until the torque required to continue turning the driven part exceeds the overrunning torque. Therefore, the cutter blade may be lifted, as slip clutches may be designed to have an overrunning torque greater than the torque required to lift the cutter blade out of the paper path. The cutter blade continues to lift until it reaches a stop or limit mechanism, preventing further rotation, greatly increasing the torque required to lift the blade, and causing the slip clutch to release.

Even after the blade is lifted and the clutch released the stepper motor must continue to expend energy overcoming the overrunning torque so the blade will not fall back into the paper path. The overrunning torque of the slip clutch is high compared to normal wrap spring clutches because the overrunning torque must be high enough to reliably open the cutter blades. Furthermore, the torque required to open the cutter blade is limited to the overrunning torque. This results in friction loss, is a waste of energy, and increases the cost of the printer because a larger stepper motor must be specified than is required to drive paper through the paper path for printing. Additionally, it is rare that a slip clutch has a constant overrunning torque during its lifetime because over time environmental conditions, wear, and age modify the behavior of the clutch. If the overrunning torque becomes too high, paper will not feed properly because too much of the stepper motor's torque is wasted overcoming the friction generated by the overrunning torque. If the overrunning torque becomes too low, the cutter blade will not open or may slip back down into the paper path during printing.

What is needed, therefore, is a device without any significant overrunning torque which will economically allow a gear system to transmit the full torque of a stepper motor in one direction, then at a predetermined stop position to disengage and allow the full torque of the stepper motor to be transmitted in the reverse rotation of the stepper motor.

SUMMARY OF THE INVENTION

The previously mentioned needs are fulfilled with the present invention. In a general sense, the present invention relates to a clutch mechanism comprising an outer member with a center hub and an inner pin wherein the rotation of the pin is less than one revolution. Accordingly, there is provided, a clutch apparatus comprised of a rotatable outer member, a pin, a resilient ringed band having circular ends with a radius sufficient to engage the pin, and a fixed stop. When the pin is engaged, it pulls on the ringed band causing a friction connection between the ringed band and the hub of the outer member. This frictional force causes the pin to rotate with the hub. At a predetermined point in the rotation, the pin and spring encounter a fixed protrusion mounted in such a way that the protrusion causes the pin to be disengaged from the strap, causing the spring to unwind and rendering it inoperative to transfer torque to the pin. Thus, the pin remains stationary with respect to the rotating outer member. When the power source is reversed, the circular spring end again engages the pin. This engagement pulls on the spring such that the spring contracts around the periphery of the hub. As such, the pin begins to rotate with the hub.

Upon another motor reversal, the pin will rotate with the spring and hub until the pin reaches its original radial position (less than one revolution). At that time, the pin again encounters the protrusion which dislodges the spring such that relatively small forces are transmitted between the spring and the hub. Consequently, the pin remains stationary as the hub continues to rotate.

In applications where, in one direction, a rotation of less than one revolution is acceptable, the use of a fixed protrusion to dislodge the pin and spring is simpler and more cost effective than that found in previous solutions. Previous solutions focused on continuous revolutions in both rotational directions. As such, they use more complex and expensive clutch mechanisms.

When a gear is added to the periphery of the outer member, the spring clutch gear is ideally suited to drive a blade to cut paper in a continuous-roll printer. In that application, the cutter gear can be fully disengaged from the drive gear when paper is fed and the pin is stationary. When the rotation is reversed, the full torque of the motor can be applied to rotate the pin and, consequently, to move the cutter blade in both directions to open and close the cutter blade.

These and other features, and advantages, will be more clearly understood from the following detailed description taken in conjunction with the accompanying drawings. It is important to note the drawings are not intended to represent the only form of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The principles of the present invention and their advantages are best understood by referring to the illustrated embodiment depicted in FIGS. 1–5 of the drawings, in which like numbers designate like parts. In the following description, well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding control circuitry or mechanisms used to control the rotation of the various elements described herein are omitted, as such control circuits are within the skills of persons of ordinary skill in the relevant art.

Figure 1:
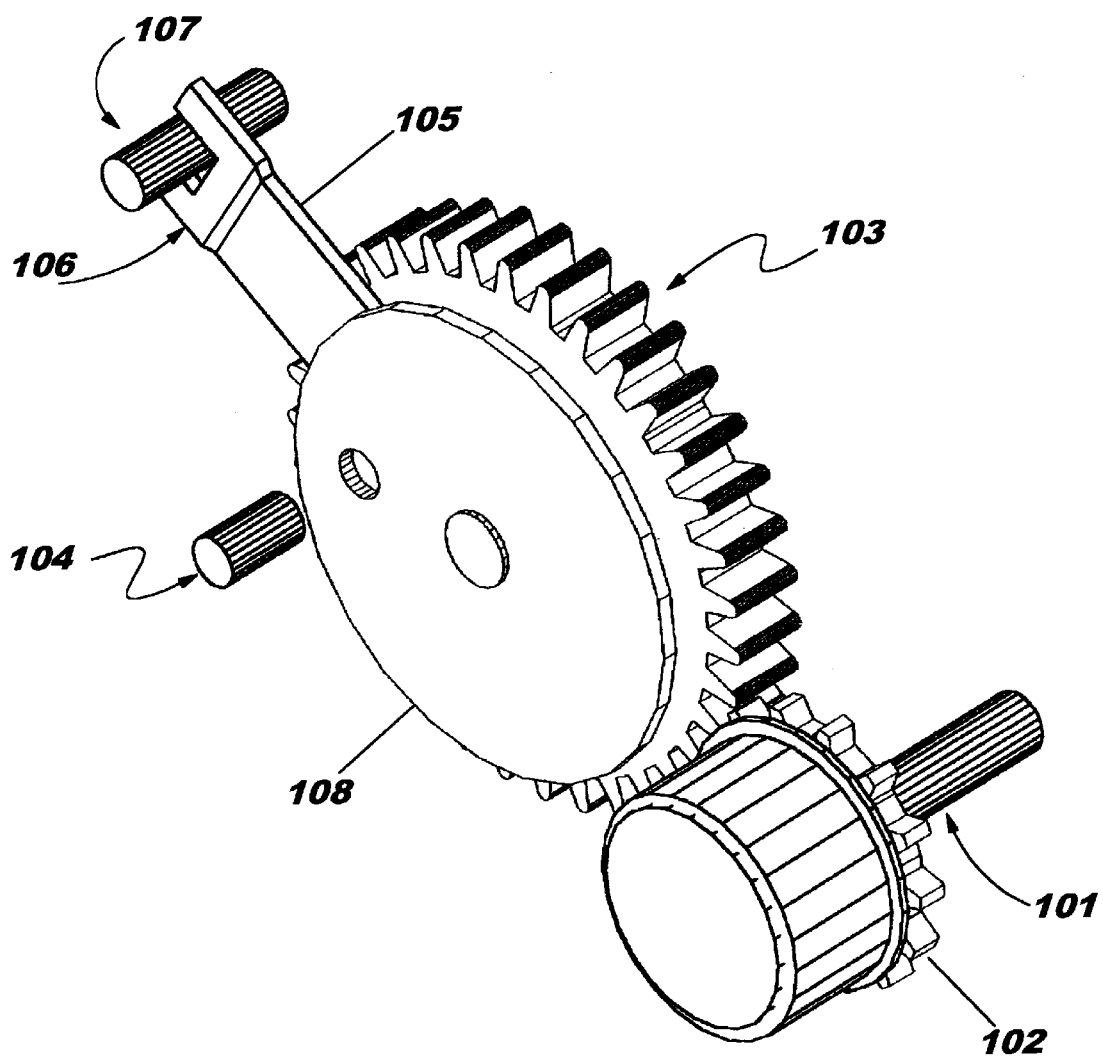
FIG. 1 is an isometric view of one embodiment of the present invention.

In FIG. 1, rotation and torque from a power source such as a stepper or drive motor 202 (see FIG. 2) are transmitted by gearing (see FIG. 2) to drive shaft 101 (partially shown). Drive shaft 101 is fixedly attached to fixed gear 102. Drive gear 102 has gear teeth around its perimeter designed to mesh with and drive the gear teeth of spring clutch gear 103.

Figure 2:
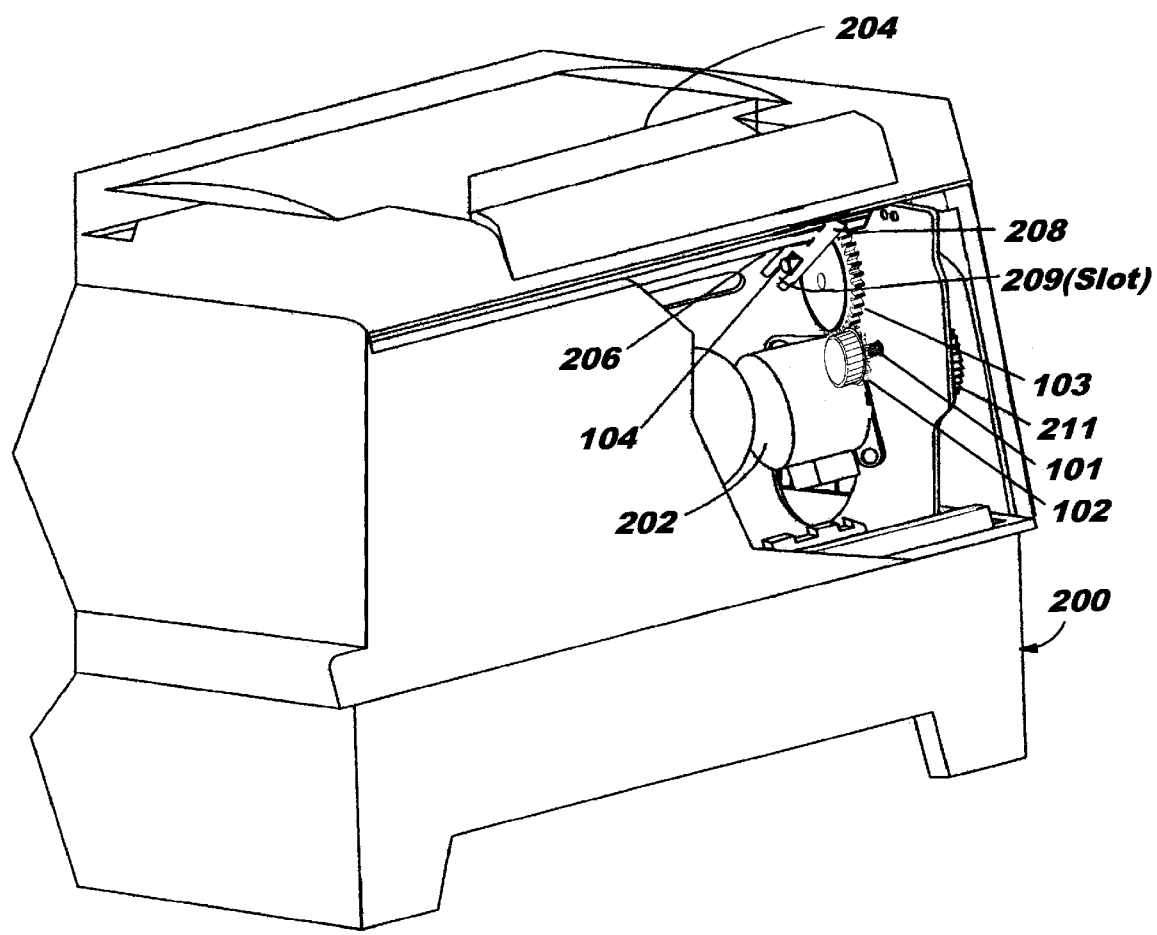
FIG. 2 is an isometric view of the embodiment of FIG. 1 shown as used in a printer.

In this example of the embodiment of the present invention, pin 104 is attached to pin disk 108 (see FIG. 2). Pin 104 extends through pin disk 108 at a point near pin disk 108's perimeter. Stop 105 is partially shown protruding from spring clutch gear 103 and connected by stop bushing 106 to stationary shaft 107, which is fixed to the machine or printer frame.

FIG. 2 illustrates the embodiment of the present invention in a continuous-roll printer. A portion of the wall of printer 200 has been removed to illustrate interior detail and a portion of the elements of the present invention. Printer 200 comprises drive motor 202 which is used to feed paper 204 from a paper roll (not illustrated) along a paper path (not illustrated) for printing by a print head (not illustrated). The paper roll is stored inside printer 200. The portion of paper 204 visible in FIG. 2 has been printed and is in a position to be cut off by cutter blade 206. Cutter blade 206 is attached to cutter blade bracket 208. Cutter blade bracket 208 comprises a slot 209. Rotation and torque from drive motor 202 are transmitted by gearing 211 (only a portion of gearing 211 is visible) to fixed gear 102.

When printing occurs, drive motor 202 transmits torque through gearing 211 and drive shaft 101 to drive gear 102. Drive gear 102 turns the gearteeth of spring clutch gear 103. However, pin 104 remains stationary with respect to spring clutch gear 103.

When printing is complete and the paper is to be cut, drive motor 202 reverses the rotation of drive shaft 101 and drive gear 102 which causes spring clutch gear 103 to rotate in the opposite direction. Pin 104 is now carried by spring clutch gear 103 as spring clutch gear 103 rotates in the reverse direction. Pin 104 engages slot 209, so that rotation of spring clutch gear 103 causes pin 104 to rotate cutter blade bracket 208 such that cutter blade 206 rotates a cut edge (not illustrated) across the paper path in a cutting motion. Drive motor 202 is preferably a stepper motor, although any power source that provides a controlled rotation may be used.

Printer 200 in FIG. 2 is only one embodiment of the present invention. Other embodiments may include fax machines having a cutter blade, a printer that uses a knife or cutter blade to cut a printed portion of paper away from a roll of paper, and the like.

Figure 3:
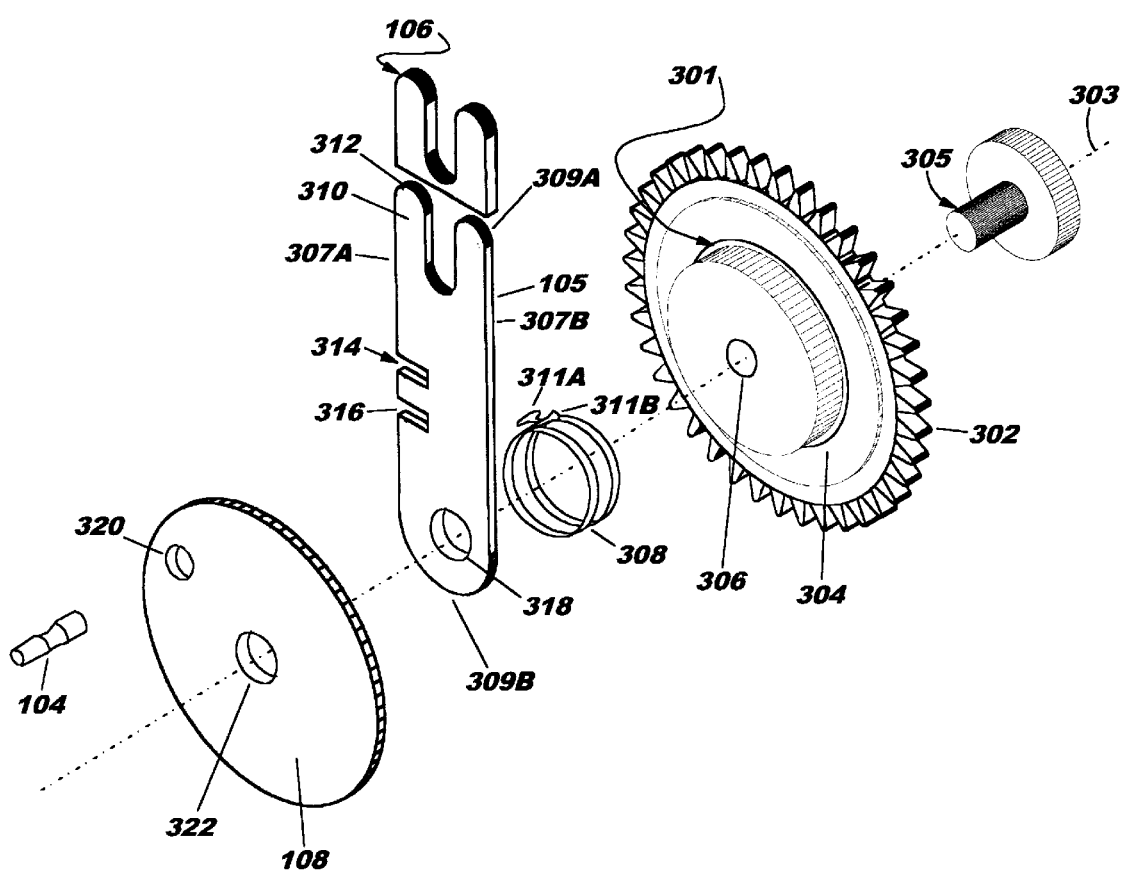
FIG. 3 is an exploded isometric view illustrating the embodiment of FIG. 1.

FIG. 3 is an exploded view of an embodiment of the present invention showing spring clutch gear 103. Spring clutch gear 103 comprises a driven gear 301, a ringed shaped band or wrap spring 308, stop 105, stop bushing 106, pin disk 108, and pin 104. Driven gear 301, stop 105, and pin disk 108 each have a substantially identical rotational axis which is the center or rotational axis 303 of shaft 305. Driven gear 301 has nonelastic gearteeth around its periphery which are sized and spaced to mesh with and be driven by the gear teeth of drive gear 102 (see FIG. 1). Protruding from one side of driven gear 301 is a cylindrical shaped hub 304 which is concentric with driven gear 301's axis of rotation. Hub 304 has an opening 306 that is also concentric with rotational axis 303. Opening 306's inner surface is rotatably mounted on shaft 305.

Spring 308 is a ringed shaped member made from resilient material. For purposes of this application and the subsequent claims the term "resilient" means the ability of a member to recover its original size and form following deformation. Spring 308 is rotatably mounted on hub 304 of driven gear 301. The ends 311A and 311B of spring 308 are bent back in a circular shape so as to easily catch pin 104.

Stop 105 is an elongated metal plate with two parallel sides 307A and 307B. Stop 105 is also illustrated in FIG. 4.

At the outside end 309A of stop 105 is a slot 312 centered between side 307A and side 307B. The other end 309B is rounded and has a circular opening 318 rotatably mounted on shaft 305. Opening 318 is centered between sides 307A and 307B. Stop bushing 106 fits onto end 309A of stop 105. Stop bushing 106 engages a stationary shaft 107 (not shown in FIG. 3) that is fixed to the machine or printer frame preventing stop 105 from rotating about rotational axis 303. On one side of stop 105 is protrusion 402 (see FIGS. 4 and 5). Protrusion 402 is created by cutting perpendicular slots into side 307A and by bending the resulting tab 90 degrees out of plane such that it is parallel to side 307A, protrusion 402 is positioned to engage either end 311A or 311B of spring 308.

Pin disk 108 is a circular plate with a circular opening 322 at its center. Circular opening 322 is rotatably mounted on shaft 305. Shaft 305 then connects with a connecting member such as a clip to connect with shaft 305 such that pin disk 108 is held in place longitudinally, but is free to rotate about rotational axis 303. Near pin disk 108's periphery is circular opening 320 from which pin 104 protrudes and is secured to pin disk 108 with a clip (not shown).

Figure 4:
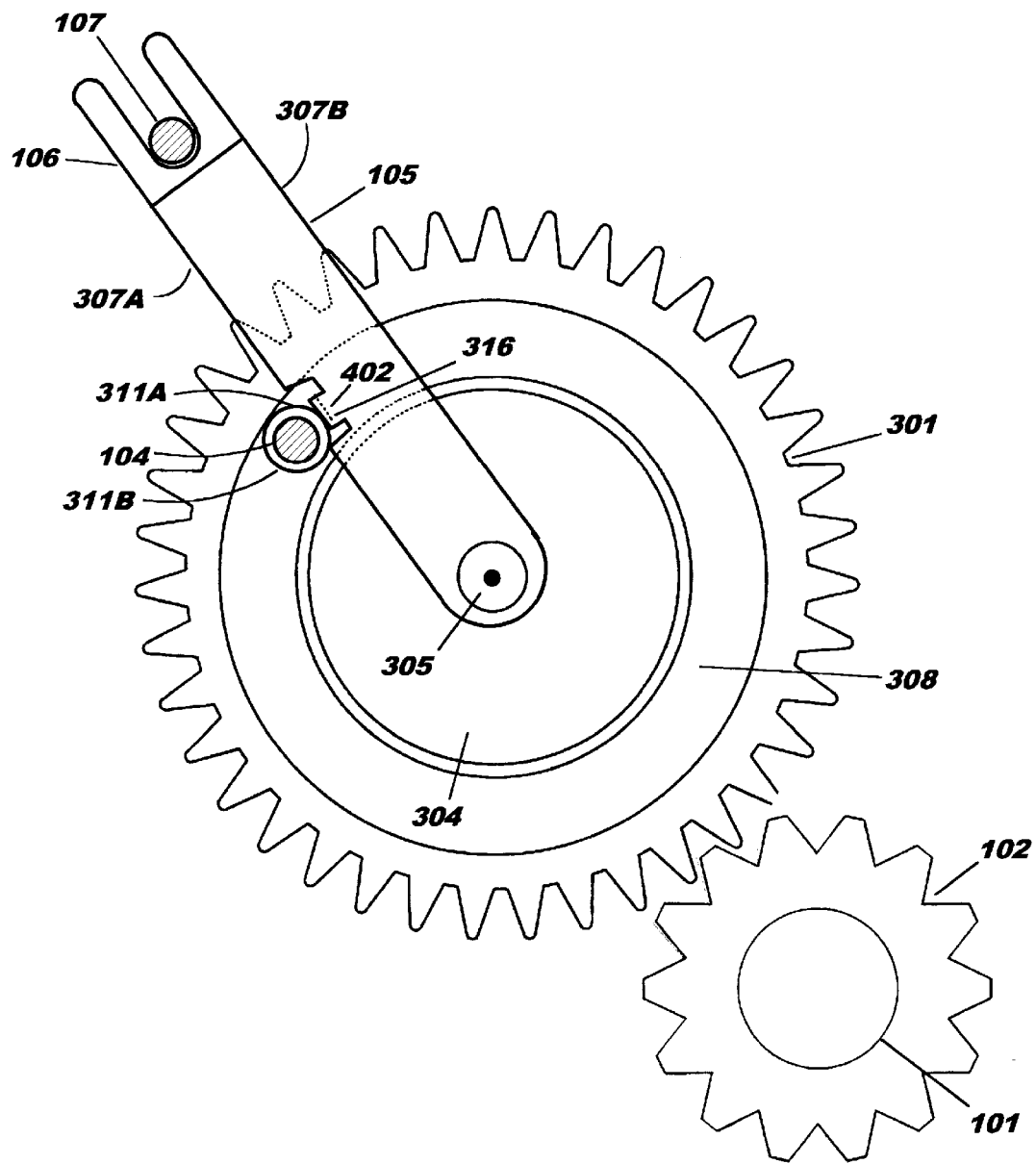
FIG. 4 is a transverse cross-section view of the embodiment of FIG. 1.
Figure 5:
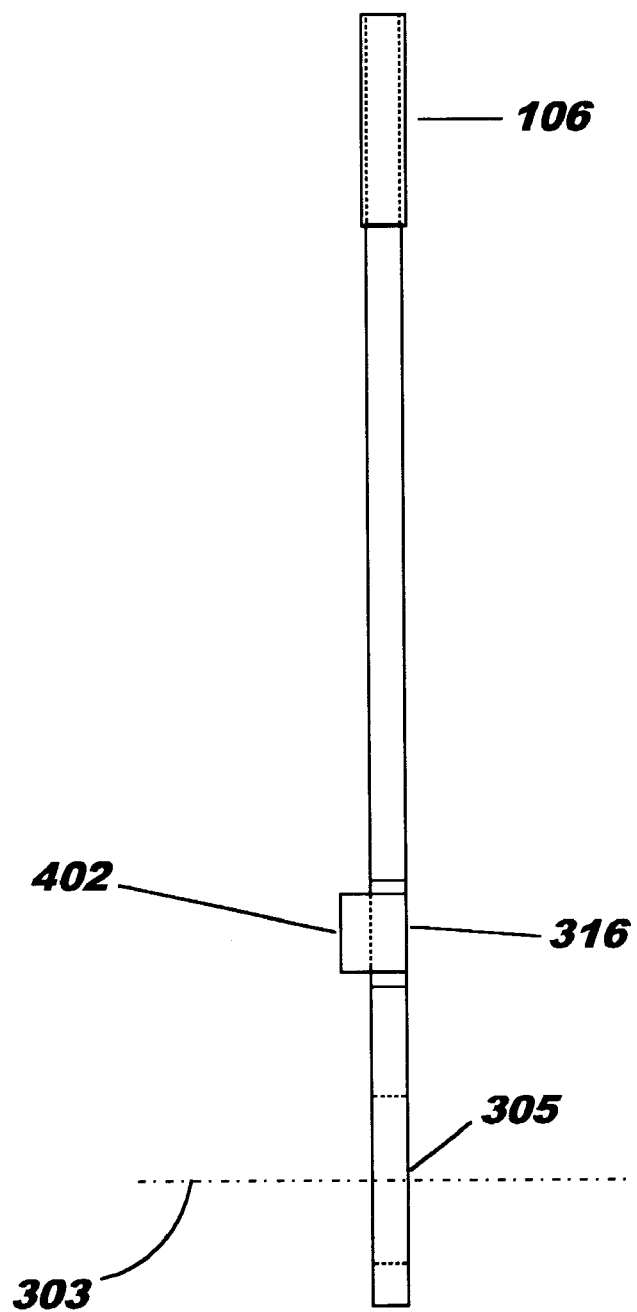
FIG. 5 is a side view of a part of the embodiment of FIG. 1.

This embodiment of the present invention is further illustrated in FIG. 4 which is a transverse section view of the embodiment in FIG. 1 and FIG. 3. In this embodiment, drive gear 102 is fixed to drive shaft 101. The teeth of fixed gear 101 are engaged with the teeth of driven gear 301. Hub 304 is shown mounted on shaft 305. Surrounding hub 304 is spring 308 which has ends 311A and 311B. Ends 311A and 311B are bent backwards into a circular shape in order to be able to engage pin 104 or protrusion 402 of stop 105. Protrusion 402 is created when two sides of notch 316 are cut and the remaining material is then bent out of plane and transverse to stop 105's longitudinal axis. Protrusion 402 is longitudinally positioned such that it can engage with end 311A of spring 308.

Pin 104 is adjacent to slot 316 of stop 105 and end 311A is engaged with protrusion 402. For clarity, pin disk 108 is not shown in FIG. 4.

OPERATION

Referring to FIG. 4, when drive gear 102 begins to rotate counterclockwise, driven gear 301 begins to rotate clockwise. End 311B surrounds pin 104 in such a way that resistance from the pin radially contracts spring 308 causing it to contact the bearing surface of hub 304. This friction contact allows the transmission of torque from hub 304, through spring 308 to pin 104. Consequently, the rotation of driven gear 301 drives pin 104 around hub 304.

When end 311A encounters protrusion 402 on stop 105, spring 308 unwinds reducing the contact between spring 308 and the bearing surface of hub 304. Thus, removing the torque from end 311B and thus reducing the transference of torque to pin 104. As such, spring 308 can slip with respect to hub 304 while pin 104 remains stationary as hub 304 continues to turn. Thus, driven gear 301 can continue to rotate around rotational axis 303 with only a small overrunning torque. However, when the motor reverses, end 311A of spring 308 engages pin 104 such that spring 308 radially contracts and thus, carries pin 104 in a counterclockwise direction. Whenever end 311A is not engaged with protrusion 402 of stop 105, the full torque of drive motor 202 can be applied to the driven gear 301 and subsequently used to rotate pin 104 about hub 304 in either direction of rotation.

A printer example shall be used to further illustrate the operation of an embodiment of the present invention. When the printer is feeding paper, drive gear 102 turns counterclockwise causing driven gear 301 to turn clockwise. Pin 104 is adjacent to slot 316 and end 311A engages protrusion 402 of stop 105 such that spring 308 slips relative to hub 304. Because spring 308 is slipping, relatively little overrunning torque is transmitted back through driven gear 301. Driven gear 301, therefore, can move relatively freely while pin 104 remains stationary. Since overrunning torque seen by shaft 101 is reduced by driven gears 301 and fixed gear 102, even less power is lost overcoming an overrunning torque of a clutch as in past solutions and related art.

When printing is completed and paper is to be cut by cutter blade 206, drive motor 202 (FIG. 2) reverses, causing gearing 211 to turn drive shaft 101 and drive gear 102 clockwise (FIG. 4). Drive gear 102 then turns driven gear 301 in a counterclockwise rotation, disengaging protrusion 402 from spring 308 such that spring end 311A is engaged with pin 104. The force from pin 104 causes spring 308 to frictionally engage with hub 304. Thus, as hub 304 rotates, pin 104 moves with it. The frictional engagement of spring 308 around hub 304 transmits torque to spring 308 such that pin 104 is moved around hub 304. Pin 104 rotates cutter blade bracket 208 such that cutter blade 206 begins to close. At this point in the cycle, full available torque can be transmitted from drive gear 102 to driven gear 301. A mechanism (not shown) such as another spring clutch or large backlash devise decouples the paperfeed drive so that the paper is not fed backwards during the cut cycle. Such a spring clutch or backlash devise is readily available in the marketplace and is familiar to those who practice the art of designing continuous feed printers and fax machines.

After the paper has been cut, normal printing and paper feeding continues. Consequently, drive motor 202 again reverses, resulting in a counterclockwise rotation of drive gear 102 and a clockwise rotation of driven gear 301. The reverse rotation engages end 311B and carries pin 104 clockwise until end 311A encounters protrusion 402 of stop 105. Full torque of drive motor 202 can be applied to the driven gear 301 and subsequently used to rotate pin 104 to open cutter blade 206. Once pin 104 engages protrusion 402, spring 308 is released and begins to slip in relation to hub 304. Thus, torque is no longer transmitted from driven gear 301 to pin 104. Driven gear 301 is then free to rotate about rotational axis 303 even though pin 104 remains stationary.

Unlike the arrangements of the related art wherein the torque to perform a second function such as opening a cutter blade is limited by the slip torque of a slip clutch, all the available torque from drive gear 102 is applied to opening the cutter blade 206. The full torque is available in both the forward and reverse directions for the desired amount of rotation while disengaging the cutter blade when pin 104 is rotated back to its original position. As such, none of the drive motor energy is lost on overcoming the overrunning torque of a slip clutch or similar related art when the printer is in a cut cycle. However, there is a small overrunning torque when printing occurs. In related art, the overrunning torque of slip clutch is much more pronounced and acts as a drag on the motor or power source and increases the size of the motor to overcome the torque resulting in a waste of energy. Additionally, as the slip clutch wears, the overrunning torque may decrease, which lessens the load on the motor, but tends to allow the cutter blade to fall open. Finally, the overrunning torque of related art may increase over time, which will increase the load on the motor, decreasing the motor's ability to feed paper through the printer. With the present invention, there is minimal overrunning torque and consequently, no additional load on the motor. As such, the motor can be more efficient and reliable.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It is, therefore, contemplated that the claims will cover any such modifications or embodiments that fall within the true scope of the invention.

What is claimed is:

1. A clutch apparatus comprising:

a rotatable input member;

an output member;

a resilient band having a ringed shaped body portion; and at least one end of said band configured such that when said end is engaged with said output member, said body portion develops a frictional driven relation with said input member such that when rotation occurs of said input member said band also rotates said end and said output member around the periphery of said body portion.

2. The clutch apparatus of claim 1 further comprising:

a fixed protrusion mounted such that when said protrusion encounters said end and said output member as said output member rotates around said body portion, said output member is disengaged such that the said output member remains stationary while said input member continues to rotate.

3. The apparatus of claim 2, where said input member further comprises an outer portion and an inner hub protruding parallel to said inner member's axis of rotation such that said outer portion and inner hub are coaxial.

4. The apparatus of claim 3, wherein said outer portion has a plurality of teeth around its outer periphery.

5. The apparatus of claim 4, further comprising a shaft concentric with said input member and said hub of said input member.

6. The apparatus of claim 5, wherein said hub contains a circular opening at its center parallel to said hub's rotational axis such that an inside surface of said hub can be rotationally mounted on said shaft.

7. The apparatus of claim 6, wherein said protrusion is fixed to a stop member having one end rotationally fixed and the other end having an opening such that said stop member can be mounted on said shaft adjacent to said hub.

8. The apparatus of claim 6, further comprising a plate containing an opening at its rotational center such that an inside surface of said opening can be rotationally mounted on said shaft.

9. The apparatus of claim 8, wherein said plate contains a circular opening near its periphery.

10. The apparatus of claim 9, wherein said output member further comprises a cylindrical shaped pin.

11. The apparatus of claim 10, further comprising a drive gear with teeth for meshing with said teeth around said periphery of said input member.

12. The apparatus of claim 11, further comprising a stepper motor, wherein power to turn the drive gear is provided by the stepper motor.

13. The apparatus of claim 12, further comprising a cutter blade controlled by said pin.

14. The apparatus of claim 13, wherein said cutter blade moves in a first direction as said pin is carried around said hub in a second rotational direction.

15. The apparatus of claim 14, wherein said cutter blade moves in a third direction as said pin is carried around said hub in a fourth rotational direction.

16. The apparatus of claim 15, further comprising a paper path along which paper is advanced for printing by a print head, wherein said cutter blade moving in said first direction crosses said paper path to cut said paper.

17. A printer apparatus comprising:

a rotatable input member having a plurality of teeth around its outer periphery and a cylindrical shaped inner hub protruding parallel to said input member's axis of rotation such that said hub is concentric with periphery of said input member;

a cylindrical shaped pin;

a resilient band having a ringed shaped body portion and at least one spiral end of sufficient radius to engage said pin such that when said pin is engaged, said body portion of said band develops a frictional driven relation with said hub such that when rotation of said hub occurs said band also rotates said end carrying said pin around the periphery of said hub;

a stop member having a fixed protrusion mounted such that when said protrusion encounters said end and said pin as said pin rotates around said hub, said pin is disengaged such that the said pin remains stationary while said hub continues to rotate.

18. The apparatus of claim 16, further comprising a printer drive gear with teeth for meshing with said teeth around said periphery of said input member.

19. The apparatus of claim 17 further comprising a stepper motor, wherein power to turn the drive gear is provided by the stepper motor.

20. The apparatus of 17, further comprising a cutter blade controlled by said pin.

21. The apparatus of claim 19, wherein said cutter blade moves in a first direction as said pin is carried around said hub in a second rotational direction.

22. The apparatus of claim 20, wherein said cutter blade moves in a third direction as said pin is carried around said hub in a fourth rotational direction.

23. The apparatus of claim 21, further comprising a paper path along which paper is advanced for printing by a print head, wherein said cutter blade moving in said first direction crosses said paper path to cut said paper.

* * * * *